United States Patent
Chen

(10) Patent No.: US 6,845,967 B2
(45) Date of Patent: Jan. 25, 2005

(54) CONTROL DEVICE FOR AN OIL DRAIN VALVE

(76) Inventor: Ching-Da Chen, 11F-3, No. 267, Sec. 2, Ta-Tung Rd., Hsi-Chih, Taipei Hsien (TW)

( * ) Notice: Subject to any disclaimer, the term of this patent is extended or adjusted under 35 U.S.C. 154(b) by 120 days.

(21) Appl. No.: 10/231,101

(22) Filed: Aug. 30, 2002

(65) Prior Publication Data

US 2003/0160203 A1 Aug. 28, 2003

(30) Foreign Application Priority Data

Feb. 27, 2002 (TW) .......................................... 91103709 A

(51) Int. Cl.[7] .............................................. F16K 31/00
(52) U.S. Cl. ........................ 251/294; 251/309; 251/310
(58) Field of Search ................................ 251/250, 293, 251/309, 310, 294

(56) References Cited

U.S. PATENT DOCUMENTS

| | | | | |
|---|---|---|---|---|
| 1,026,039 A | * | 5/1912 | Humphrey | 251/230 |
| 1,095,295 A | * | 5/1914 | Stevens | 251/230 |
| 4,319,664 A | * | 3/1982 | Price et al. | 184/1.5 |
| 4,872,365 A | * | 10/1989 | Wolf | 74/501.6 |

* cited by examiner

Primary Examiner—Edward K. Look
Assistant Examiner—John K. Fristoe, Jr.
(74) Attorney, Agent, or Firm—Troxell Law Office PLLC

(57) ABSTRACT

A control device for an oil drain valve can control opening and closing of the oil drain valve at a far end. The oil drain valve includes a base and a control element connected to the base. The control device further includes a guide element and a driving element. The guide element at an end thereof is joined to the base and the driving element passes through the guide element. An end of the driving element is joined to the control element and another end of the driving element can be pulled from the far end to rotate the control element for controlling opening and closing.

17 Claims, 9 Drawing Sheets

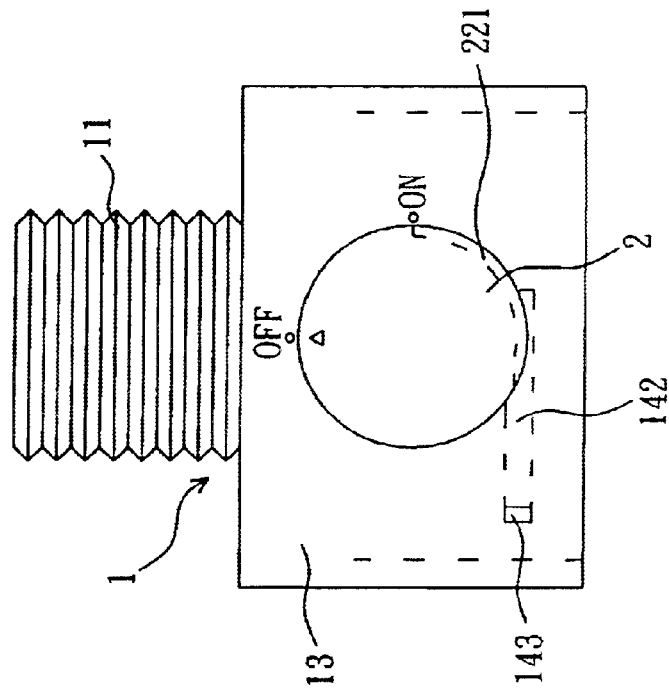
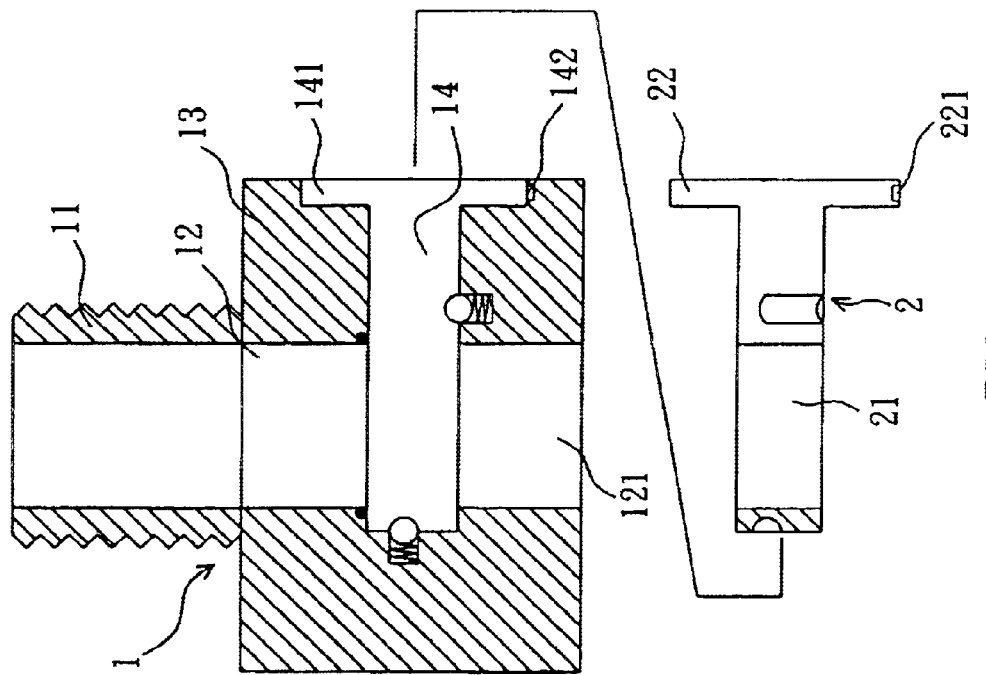

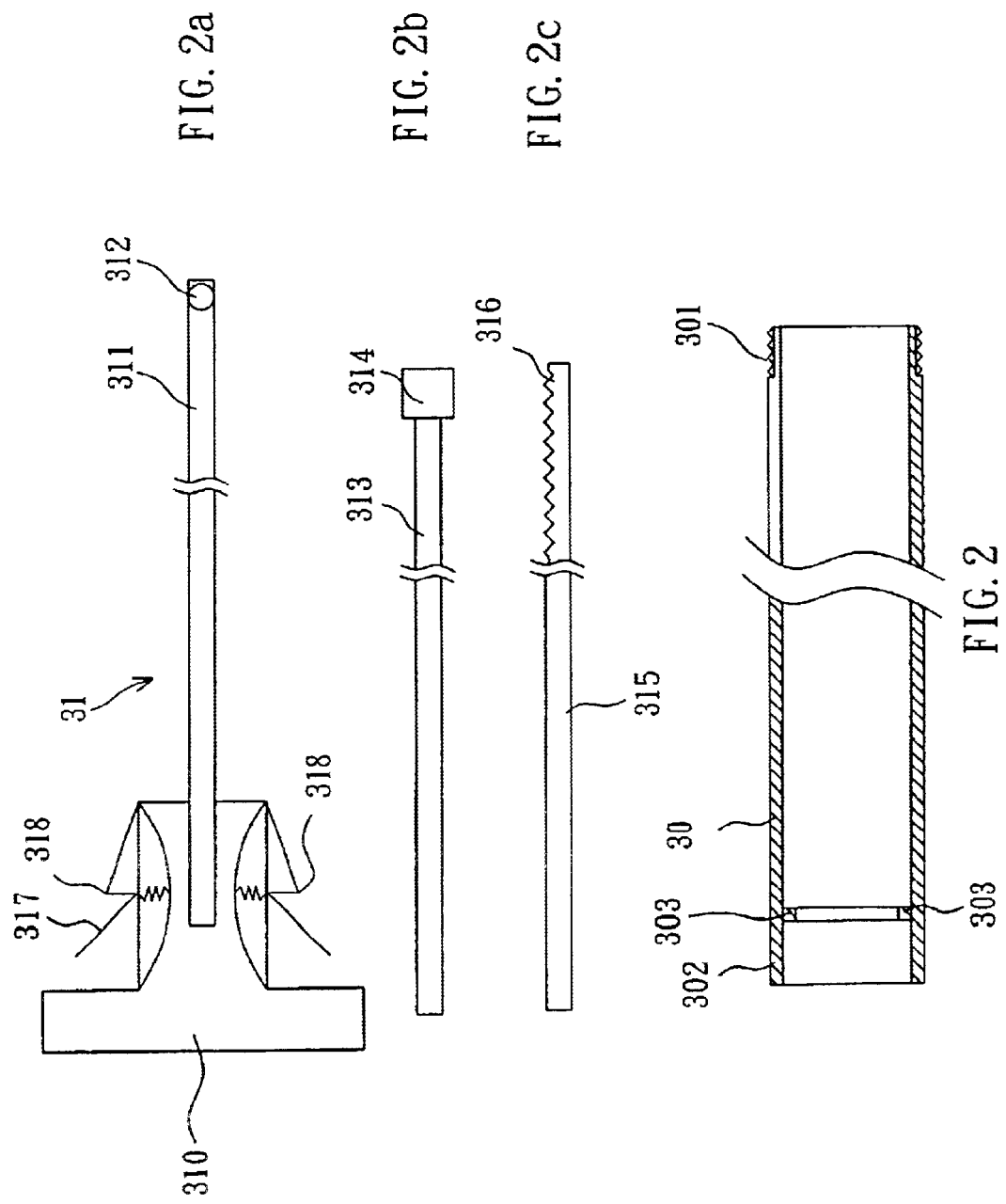

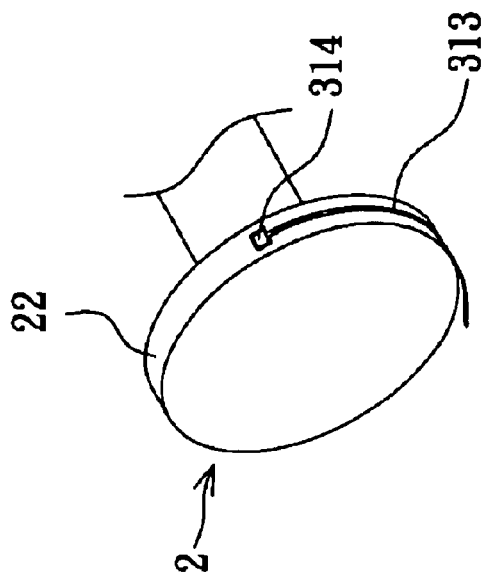
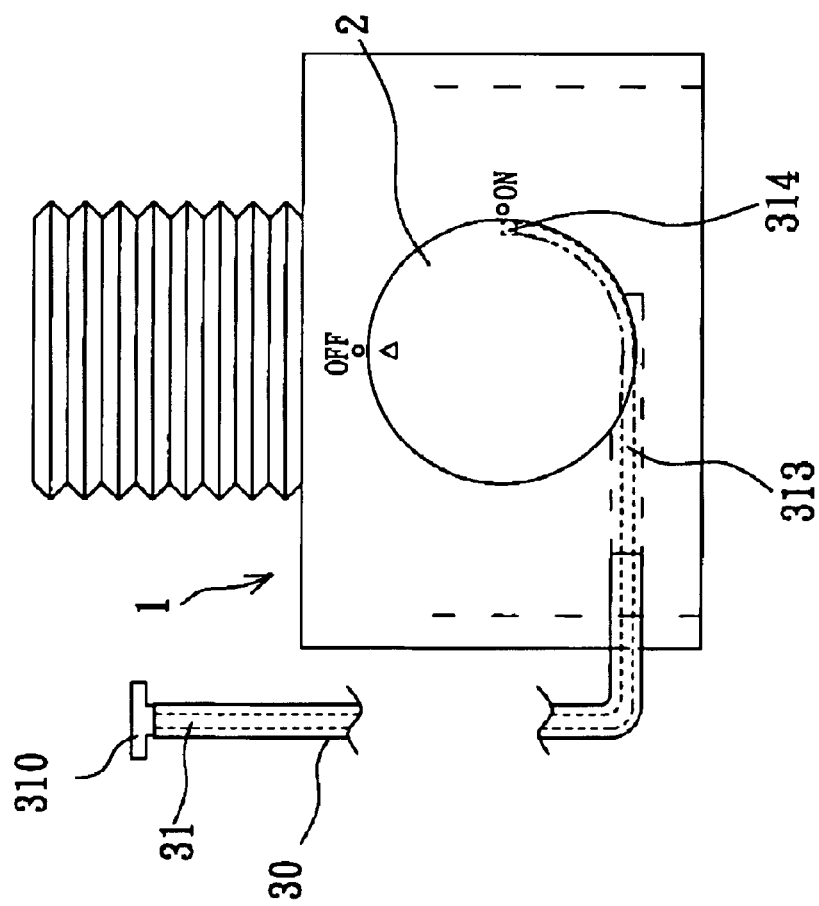
FIG. 4b
FIG. 4a

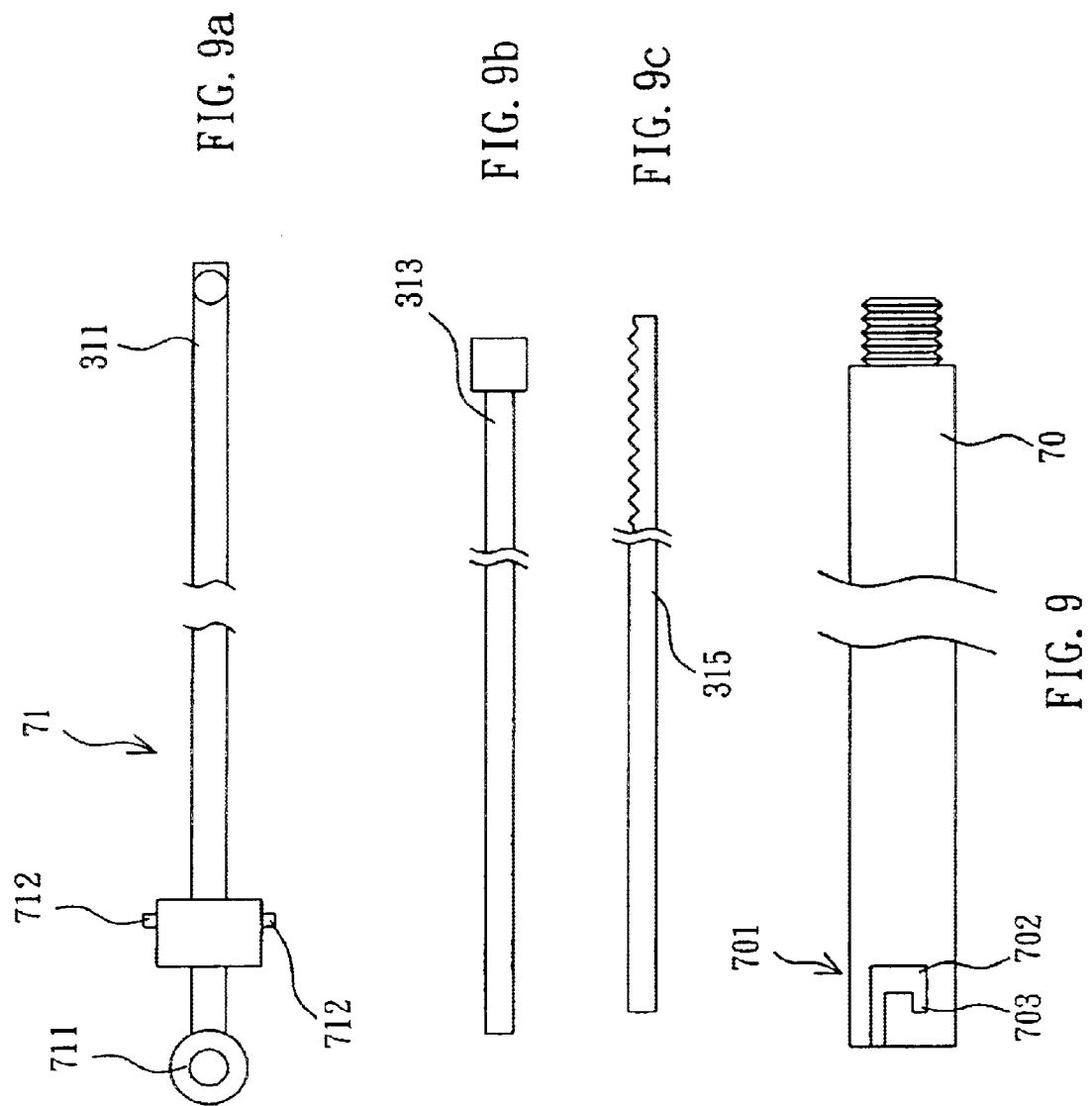

CONTROL DEVICE FOR AN OIL DRAIN VALVE

BACKGROUND OF THE INVENTION

1. Field of the Invention

The present invention relates to a control device of a valve located at the lower end of an oil vessel.

2. Description of Related Art

Usually, in order to reduce wear out of the engine of an ordinary automobile or motorcycle and maintain smooth running thereof, the lubrication oil in the engine has to be renewed after a period of time. Currently, the discharge outlet for the lubrication oil is plugged with a screw together with a washer so that it is necessary to detach both the screw and the washer with a tool before the lubrication can flow out from the oil reservoir. Also, it is necessary to replace the washer before the screw can be fastened to the discharge outlet after the used lubrication oil having been drained. However, it is easy for the screw to become loosening after several times of fastening and unfastening so that it is not possible for the screw to engage with the discharge port tightly. Hence, it is often to occur a phenomenon of leakage and it is necessary to replace the screw. Up to the present, the operation of discharging the oil in the oil reservoir exists the deficiencies such as tool using, tedious operation, replacing washer, easy-leakage. The Taiwan Patent Publication No. 465705 entitled OIL DRAIN VALVE, which has been granted to the present inventor, has improved most of the deficiencies generating from the conventional structure using the screw blocking the discharge port. However, in case of the oil drain valve is disposed under the engine, the body of the car has to be lifted for being able to turn the control element at the bottom of the oil drain valve before the operation of oil draining can be performed so that Taiwan patent publication No. 465705 has still inconvenience for the user.

SUMMARY OF THE INVENTION

It is the main object of the present invention to provide a control device for an oil drain valve, which can carry out the operation of oil drain to open and close the oil drain valve from a far end without the need of any tool.

BRIEF DESCRIPTION OF THE DRAWINGS

The present invention can be more fully understood by reference to the following description and accompanying drawings, in which:

FIG. 1a is a dissassembled sectional view of an oil drain valve in an embodiment thereof according to the present invention;

FIG. 1b is an assembled side view of the oil drain valve shown in FIG. 1;

FIG. 2 is a sectional view of a guide element of a control device in an embodiment thereof according to the present invention:

FIGS. 2a, 2b and 2c are each a plan view of a driving element of a control device in an embodiment thereof according to the present invention;

FIG. 4a is a plan view illustrating another embodiment of the oil drain device being associated with the control device;

FIG. 4b is a perspective view illustrating another embodiment of a driving part being associated with the control device;

FIG. 6b is a top view of a control element of the oil drain valve shown in FIG. 6a;

FIG. 6c is at top view of a base of the oil drain valve shown in FIG. 6a;

FIG. 9 is a plan view of a guide element of a control device in another embodiment thereof according to the present invention;

FIGS. 9a–9c are each a plan view of a driving element of a control device in an embodiment thereof according to the present invention.

DETAILED DESCRIPTION OF THE PREFERRED EMBODIMENTS

Figure 3B:
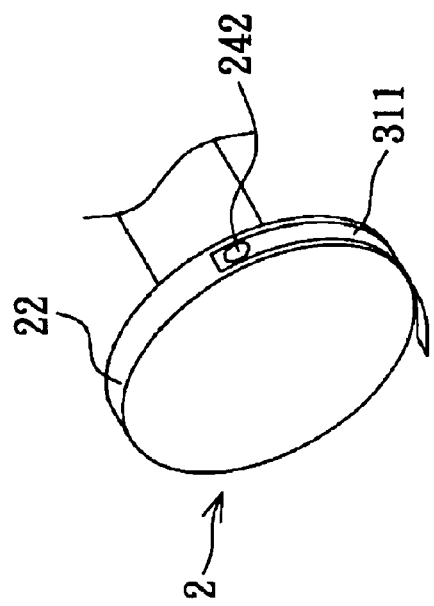
FIG. 3b is a perspective view illustrating an embodiment of a driving part being associated with the control device.
Figure 3A:
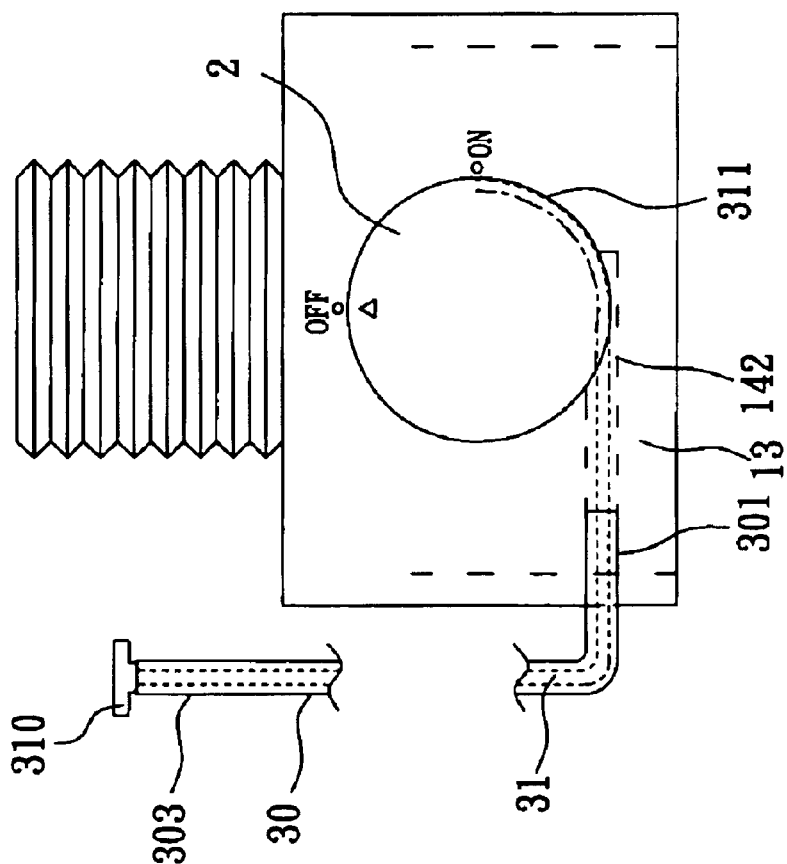
FIG. 3a is a plan view illustrating an embodiment of the oil drain device being associated with the control device.

Referring to FIGS. 1a and 1b, an embodiment of an oil drain valve according to the present invention is composed of a base 1 and a control element 2. The base 1 at the upper end thereof has a threaded tube 11 for engaging with a discharge port of an oil reservoir, at the interior thereof is a hollow chamber 12 to communicate with the threaded tube 11, at the bottom thereof is provided with a guide mouth 121 and at the lateral wall 13 thereof has a joining hole 14. The joining hole 14 at the outer end thereof is provided with an enlarged recess 141 and a circular groove 142 extends a circular distance along the perimeter of the recess 141 such that the guide groove 142 can communicate with the recess 141. The control element 2 is a stem shaped body with a through hole corresponding to the hollow chamber 12 as an outlet 21 and a large diameter part 22 being at the front end thereof fitting with the recess 141. A fixing groove 221 is provided at the circumference of the large diameter part 22. The control element 2 is inserted into the hollow chamber 12 along the joining hole 14 of the base 1 and when the guide mouth 121 communicates with the outlet 21, the oil in the reservoir can be discharged via the guide mouth 121. Referring to FIG. 2, the base 1 at the lateral wall 13 thereof has a hole 143 communicating with the guide groove 142 and the hole 143 at the inner surface thereof is provided with screws threads. Once the control element 2 is rotated an angular movement, the guide mouth 121 becomes not communicating with the outlet 21 and is blocked with an outer wall of the control element 2 to prevent the oil from discharging via the guide mouth 121.

Referring to FIG. 2 again, a control device of the present invention includes a guide element 30 and a driving element 31. The guide element 30 is a bendable and incompressible elongated tube such as a conventional tube covering the brake wires in a bicycle or a motorcycle. The guide element 30 at the inner side thereof is a through hole with an end thereof being an engaging part 301 and anther another end thereof being a fixing part 302. The engaging part 301 is provided with external screw threads to engage with the hole 143 in the lateral wall 13 of the base 1 and the fixing part 302 has an inner rib ring 303. Referring to FIGS. 2a–2c, the driving element 31 includes a front section 310 associated with an elongated body made of bendable and incompressible material such as steel. The elongated body can be an elongated strip 311 with a rear end thereof having a hole 312, an elongated wire 313 with a rear end thereof having a joined block 314 or an elongated strip 315 with a rear end thereof having a line of tooth rack 316. The front section 310 is provided with a pair of spring plate 317 in the present embodiment. Each of the spring plates 317 is provided with an engaging section 318 at the middle portion thereof. When the spring plates at the front ends thereof are pressed downward, a space between the two engaging sections 318 so as to allow the engaging parts passing through the rib ring 303 of the guide element 30. When the spring plates 317 at the front end thereof is free from being pressed, the two engaging sections 318 becomes in a state of expanding to increase the space in between so as to be jammed at the inner side of the rib ring 303.

Referring to 3a and 3b, during assembling, the elongated body of the driving element 31 passes through the guide element 30 and the front section 310 thereof is placed at the outer end of the guide element 30. The joining part 301 of the guide element 30 is engaged to the lateral wall 13 of the base 1. The elongated strip 311 of the driving element 31 passes through the guide groove 142 of the lateral wall 13 and is received in the fixing groove of the control element 2 (as shown in FIG. 4b). The rear section of the driving element 31 is fixed in the fixing groove of the control element 2 by way of a rivet 242 passing through a hole. The guide element 30 at the fixing part 303 thereof is joined to a certain position and the control element 2 can be actuated to rotate an angular movement to open a control valve as soon as the driving element 31 is pulled out. The control element 2 can rotate an angular movement inversely to close the control valve as soon as the driving element 31 is pushed inward with the front end thereof being inserted into the guide element 30.

Referring to FIGS. 4a and 4b, another embodiment of the present invention discloses the elongated body 313 fits with the fixing groove of the control element 2 and the joining block 314 is utilized to inserted into the joining groove of the control element 2 such that the elongated body 313 at the rear end thereof can be fixed to the control element 2. The far end of the driving element 31 can actuates to rotate the control element so as to control opening or closing of the oil drain valve.

Figure 5:
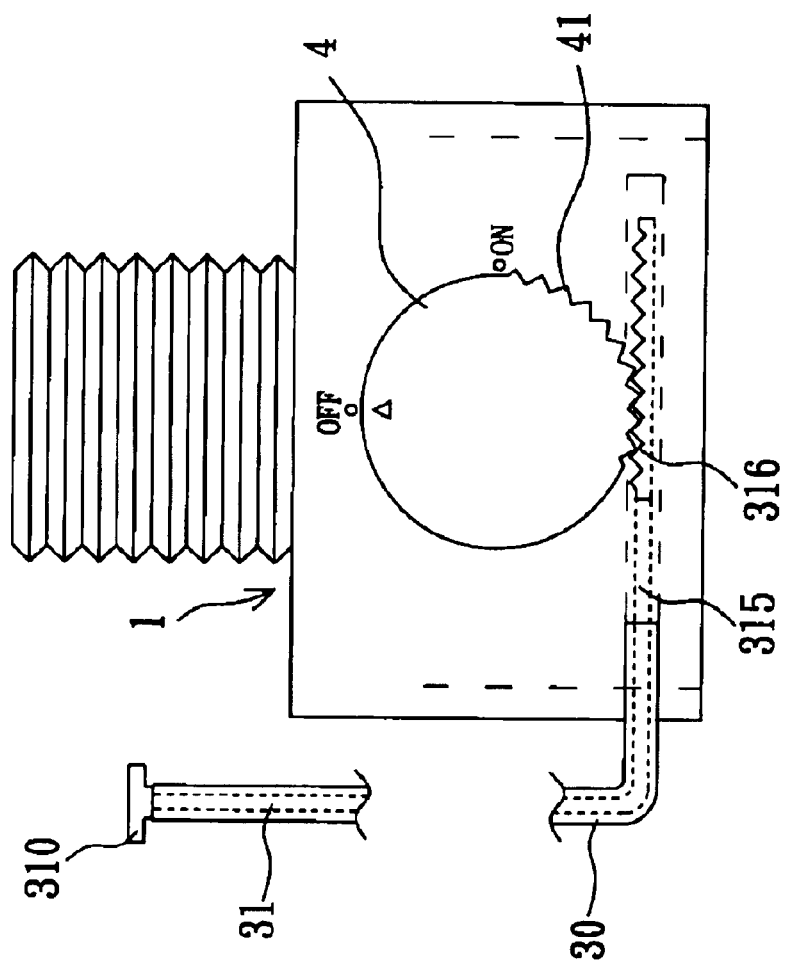
FIG. 5 is a plan view illustrating a further embodiment of the oil drain device being associated with the control device.

Referring to FIG. 5, a further embodiment of the present invention discloses partial periphery of the control element 4 is provided with tooth ring 41 to mesh with a tooth rack 316 provided at the rear end of the elongated strip 315 such that the control element 4 can be actuated to rotate for controlling opening or closing of the oil drain valve.

Figure 6C:
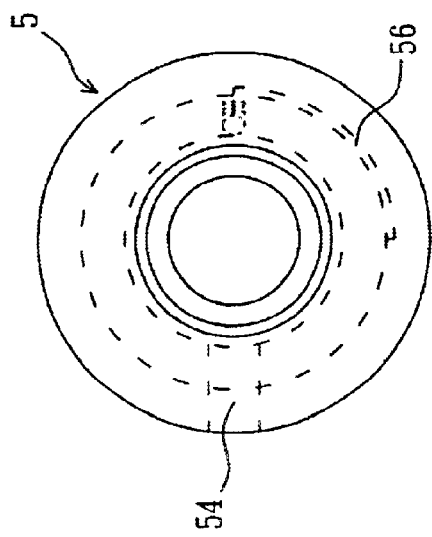
Figure 6B:
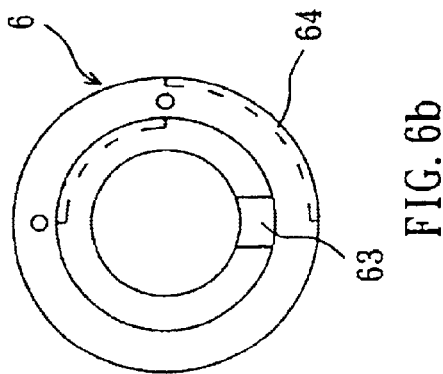
Figure 6A:
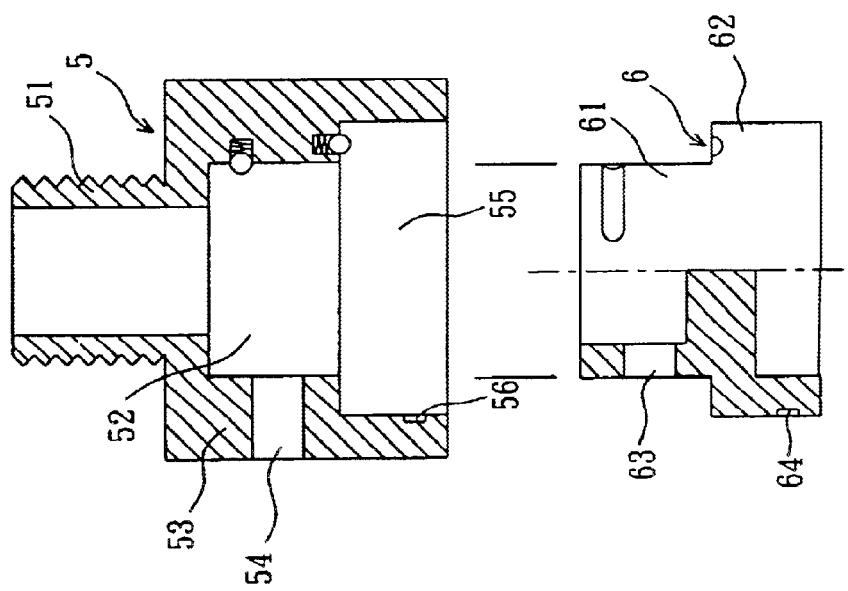
FIG. 6a is a disassembled sectional view of an oil drain valve in another embodiment thereof according to the present invention.

Referring to FIGS. 6a–6c, further embodiment of the oil drain valve according to the present invention includes a base 5 and a control element 6, wherein the base 5 at the upper end thereof has a threaded pipe 51 to engage with the oil vessel at the inner side of the outlet thereof. The base 5 at the inner side thereof has a hollow chamber 52 to communicate with the threaded pipe 51, at the lateral wall 53 thereof has a guide mouth 54 and at the bottom face thereof has a fitting opening 55 with a small section of guide groove 56 at the upper lateral wall thereof. The control element 6 has a cylindrical part 61 and an enlarged lower cap 62 with an outlet 63 at the wall of the cylindrical part 61 and a section of fixing groove 64 at the circumferential side of the lower cap 62. The cylindrical part 61 of the control element is inserted into the hollow chamber 52 from the bottom face of the base 5. Once the guide mouth 54 communicates with the outlet 63, the oil in the vessel can discharge via the guide mouth 54. Once the control part 6 is turned an angular movement to result in the guide mouth 54 not communicating with the outlet 63, the guide mouth 54 is blocked with the outer wall of the cylindrical part 61 and the oil is unable to discharge via the guide mouth 54.

Figure 7:
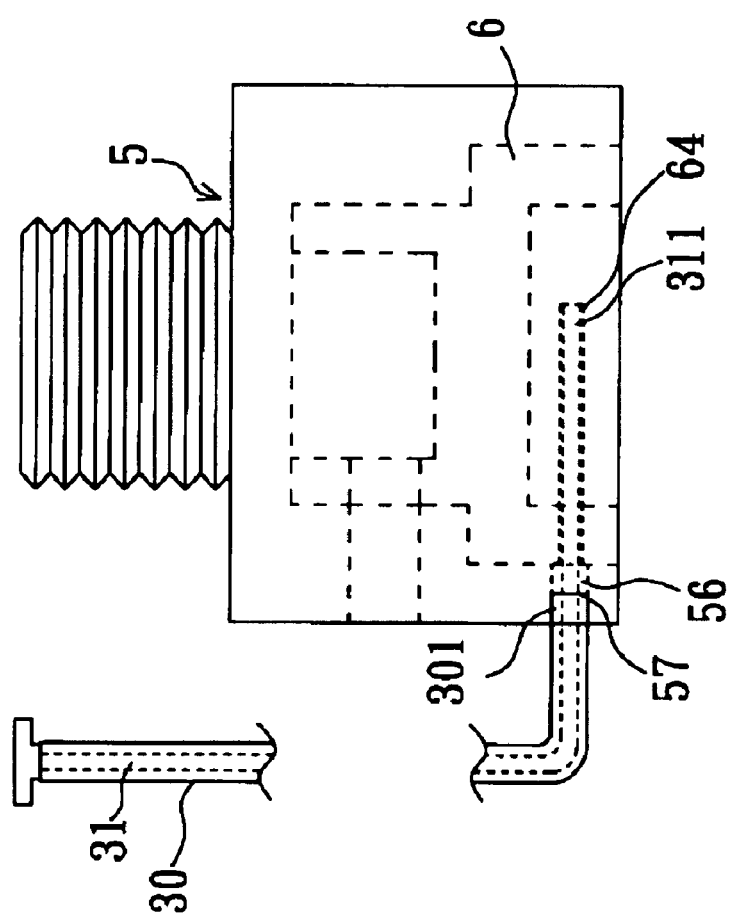
FIG. 7 is a plan view illustrating a further embodiment of the oil drain device being associated with the control device.
Figure 8B:
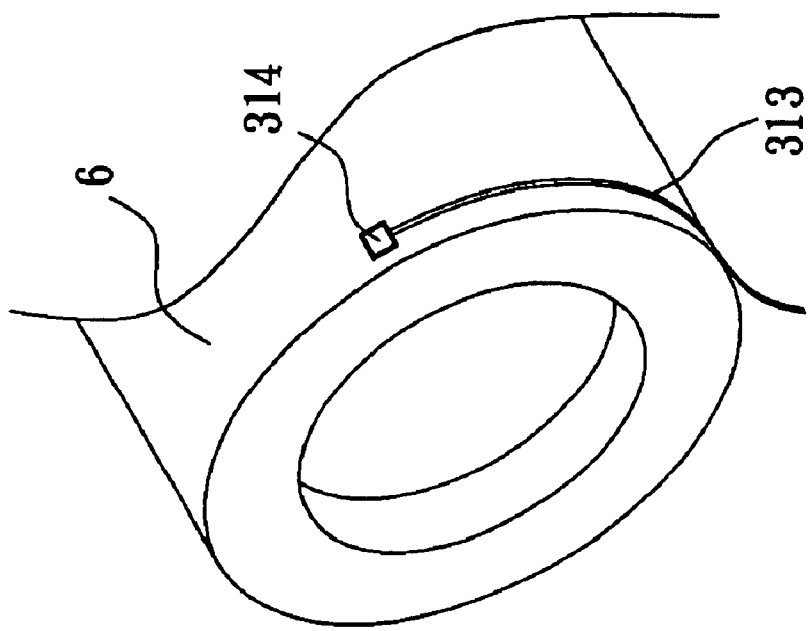
FIG. 8b is a perspective view illustrating further embodiment of the driving part being associated with the control device.
Figure 8A:
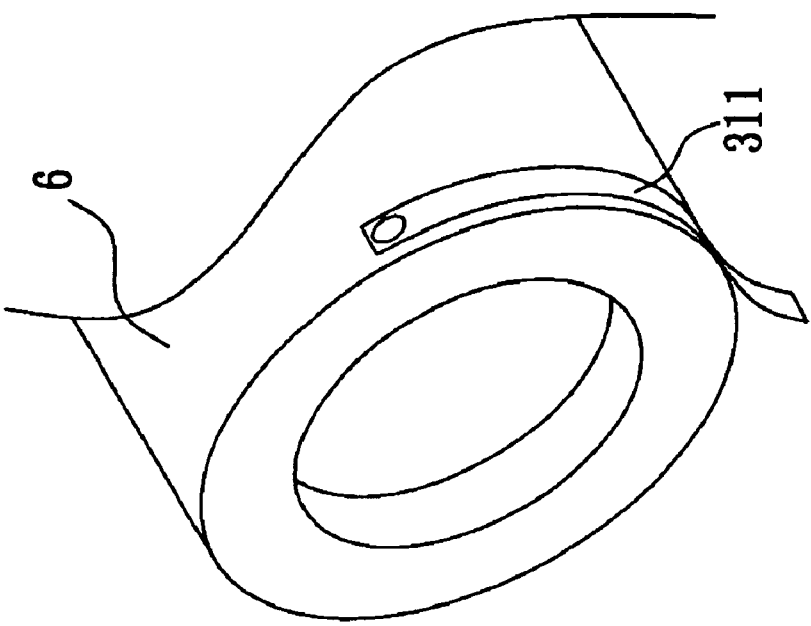
FIG. 8a is a perspective view illustrating a further embodiment of the driving part being associated with the control device.

Referring to FIG. 7, a hole 57 is provided at the lower outer side of the base 5 to communicate with the guide groove 56 in the oil drain valve shown in FIGS. 6a and 6b. The hole 57 is provided with internal screw threads to engage with the external screw threads on the joining part of the guide element 6. The driving element 31 at the rear end thereof can be fixed in the fixing groove 64 of the control element 6 as shown in FIGS. 8a and 8b. It can be seen that the elongated strip 311 or the elongated body 313 at the rear end thereof is fixed in the fixing groove of the control element 6 respectively. As soon as the driving element 31 at the far end thereof is pulled out or pushed inward, the control element 6 is actuated to turn for controlling opening or closing.

Referring to FIG. 9, a fixing part 701 of the guide element 70, which is another embodiment of the guide element, extends inward a pair of symmetrical guide grooves 702 from the opening of the tube wall and the guide grooves 702 has a fixing section 703 respectively. Referring to FIGS. 9a–9c, the driving element 71 at the front section 711 thereof has a pair of engaging projections 712 and the spacing between the engaging projections 712 is greater than the inner diameter of the guide element such that the engaging projections 712 can move along the guide groove 702 and be turned an angular movement and received in the fixing section 703. In this way, the driving element 71 at the front section 711 thereof can be fixed to the guide element 70 and the projections 712 retreat from the guide groove 702 so as to pull out the driving element 71.

While the invention has been described with reference to the preferred embodiments thereof, it is to be understood that modifications or variations may be easily made without departing from the spirit of this invention which is defined by the appended claims.

What is claimed is:

1. A control device for an oil drain valve, comprising:
   an oil drain valve; and
   a control device, being associated with the oil drain valve;
   wherein the oil drain valve further comprising
   a base, having an upper end thereof being joined to a discharge port of an oil reservoir, being a hollow chamber at an interior thereof communicating the discharge port, and providing a guide mouth communicating with the hollow chamber and providing a joining hole; and
   a control element, being received in the joining hole and providing an outlet;
   and the control device further comprising
   a guide element, an end thereof being associated with the base; and
   a driving element, an end thereof passing through the guide element and a rear end thereof being joined to the control element;
   whereby, oil in the reservoir can discharge outward during the control element is turned to allow the guide mouth communicating with outlet; and another end of the driving element can be pulled from a far location and actuate the control element to rotate and control opening and closing of the oil drain valve, wherein the base at a lateral wall thereof is provided with a hole and a guide groove communicating with the hole; the guide element has a through hole communicating with the hole; and the driving element includes a front section joined to an elongated body with a rear end thereof passing through the guide groove, wherein the control element is provided with fixing groove and the elongated body at the rear end thereof is joined to the fixing groove.

2. The control device for an oil drain valve according to claim 1, wherein the elongated body is an elongated strip with a hole at the rear end thereof and a rivet passes through the hole and fixes at the fixing groove of the control element.

3. The control device for an oil drain valve according to claim 2, wherein the guide element at an end thereof is provided with screw threads engages with internal screw threads at an inner surface of the hole in the lateral wall of the base.

4. The control device for an oil drain valve according to claim 3, wherein the guide element at an end thereof has an inner rib ring and at the front section thereof has a pair of spring plates with each of the spring plates at a middle section thereof being an engaging section respectively such that a spacing between the two middle sections can be shortened to pass through the rib ring during a front end of the spring plate being pressed and the engaging sections can expand to increase the spacing and retain at an inner side of the rib ring during the front end of spring being released.

5. The control device for an oil drain valve according to claim 3, wherein the guide element at a tube wall of another end thereof extends inward a pair of symmetrical guide grooves from an opening thereof with each of the guide grooves having a fixing section respectively and the driving element at the front section thereof has a pair of projections with a clearance between the projections being greater than an inner diameter of the guide element such that the projections can move along the guide groove and turn an angular movement to be received in the fixing section of the driving element fixedly attached to the guide element.

6. The control device for an oil drain valve according to claim 1, wherein the elongated body is an elongated wire with a rear end thereof being providing with a joining block and the joining block is inserted into the joining groove of the control element.

7. The control device for an oil drain valve according to claim 6, wherein the guide element at an end thereof is provided with screw threads engages with internal screw threads at an inner surface of the hole in the lateral wall of the base.

8. The control device for an oil drain valve according to claim 7, wherein the guide element at an end thereof has an inner rib ring and at the front section thereof has a pair of spring plates with each of the spring plates at a middle section thereof being an engaging section respectively such that a spacing between the two middle sections can be shortened to pass through the rib ring during a front end of the spring plate being pressed and the engaging sections can expand to increase the spacing and retain at an inner side of the rib ring during the front end of spring being released.

9. The control device for an oil drain valve according to claim 7, wherein the guide element at a tube wall of another end thereof extends inward a pair of symmetrical guide grooves from an opening thereof with each of the guide grooves having a fixing section respectively and the driving element at the front section thereof has a pair of projections with a clearance between the projections being greater than an inner diameter of the guide element such that the projections can move along the guide groove and turn an angular movement to be received in the fixing section of the driving element fixedly attached to the guide element.

10. The control device for an oil drain valve according to claim 1, wherein the guide element at an end thereof is provided with screw threads engages with internal screw threads at an inner surface of the hole in the lateral wall of the base.

11. The control device for an oil drain valve according to claim 10, wherein the guide element at an end thereof has an inner rib ring and at the front section thereof has a pair of spring plates with each of the spring plates at a middle section thereof being an engaging section respectively such that a spacing between the two middle sections can be shortened to pass through the rib ring during a front end of the spring plate being pressed and the engaging sections can expand to increase the spacing and retain at an inner side of the rib ring during the front end of spring being released.

12. The control device for an oil drain valve according to claim 10, wherein the guide element at a tube wall of another end thereof extends inward a pair of symmetrical guide grooves from an opening thereof with each of the guide grooves having a fixing section respectively and the driving element at the front section thereof has a pair of projections with a clearance between the projections being greater than an inner diameter of the guide element such that the projections can move along the guide groove and turn an angular movement to be received in the fixing section of the driving element fixedly attached to the guide element.

13. A control device for an oil drain valve, comprising:
an oil drain valve; and
a control device, being associated with the oil drain valve;
wherein the oil drain valve further comprising
a base, having an upper end thereof being joined to a discharge port of an oil reservoir, being a hollow chamber at an interior thereof communicating the discharge port, and providing a guide mouth communicating with the hollow chamber and providing a joining hole; and
a control element, being received in the joining hole and providing an outlet;
and the control device further comprising
a guide element, an end thereof being associated with the base; and
a driving element, an end thereof passing through the guide element and a rear end thereof being joined to the control element;
whereby, oil in the reservoir can discharge outward during the control element is turned to allow the guide mouth communicating with outlet; and another end of the driving element can be pulled from a far location and actuate the control element to rotate and control opening and closing of the oil drain valve, wherein the base at a lateral wall thereof is provided with a hole and a guide groove communicating with the hole; the guide element has a through hole communicating with the hole; and the driving element includes a front section joined to an elongated body with a rear end thereof passing through the guide groove, wherein the control element at the at a perimeter thereof is provided with a teeth ring and the elongated body is an elongated strip with a teeth rack at the rear end thereof meshing with the teeth ring.

14. The control device for an oil drain valve according to claim 13, wherein the guide element at an end thereof is provided with screw threads engages with internal screw threads at an inner surface of the hole in the lateral wall of the base.

15. The control device for an oil drain valve according to claim 14, wherein the guide element at an end thereof has an inner rib ring and at the front section thereof has a pair of spring plates with each of the spring plates at a middle section thereof being an engaging section respectively such that a spacing between the two middle sections can be shortened to pass through the rib ring during a front end of the spring plate being pressed and the engaging sections can expand to increase the spacing and retain at an inner side of the rib ring during the front end of spring being released.

16. The control device for an oil drain valve according to claim 14, wherein the guide element at a tube wall of another end thereof extends inward a pair of symmetrical guide grooves from an opening thereof with each of the guide grooves having a fixing section respectively and the driving element at the front section thereof has a pair of projections with a clearance between the projections being greater than an inner diameter of the guide element such that the projections can move along the guide groove and turn an angular movement to be received in the fixing section of the driving element fixedly attached to the guide element.

17. A control device for an oil drain valve, comprising:

an oil drain valve; and a control device, being associated with the oil drain valve; wherein the oil drain valve further comprising a base, having an upper end thereof being joined to a discharge port of an oil reservoir, being a hollow chamber at an interior thereof communicating the discharge port, and providing a guide mouth communicating with the hollow chamber and providing a joining hole; and a control element, being received in the joining hole and providing an outlet;

and the control device further comprising a guide element, an end thereof being associated with the base; and a driving element, an end thereof passing through the guide element and a rear end thereof being joined to the control element;

whereby, oil in the reservoir can discharge outward during the control element is turned to allow the guide mouth communicating with outlet; and another end of the driving element can be pulled from a far location and actuate the control element to rotate and control opening and closing of the oil drain valve, wherein the base at a lateral wall thereof is provided with a hole and a guide groove communicating with the hole; the guide element has a through hole communicating with the hole; and the driving element includes a front section joined to an elongated body with a rear end thereof passing through the guide groove, wherein the guide element at an end thereof is provided with screw threads engages with internal screw threads at an inner surface of the hole in the lateral wall of the base.

* * * * *